Aug. 31, 1954  C. M. RUTLEDGE  2,687,895
GOLF CART
Filed Oct. 1, 1952  2 Sheets-Sheet 1
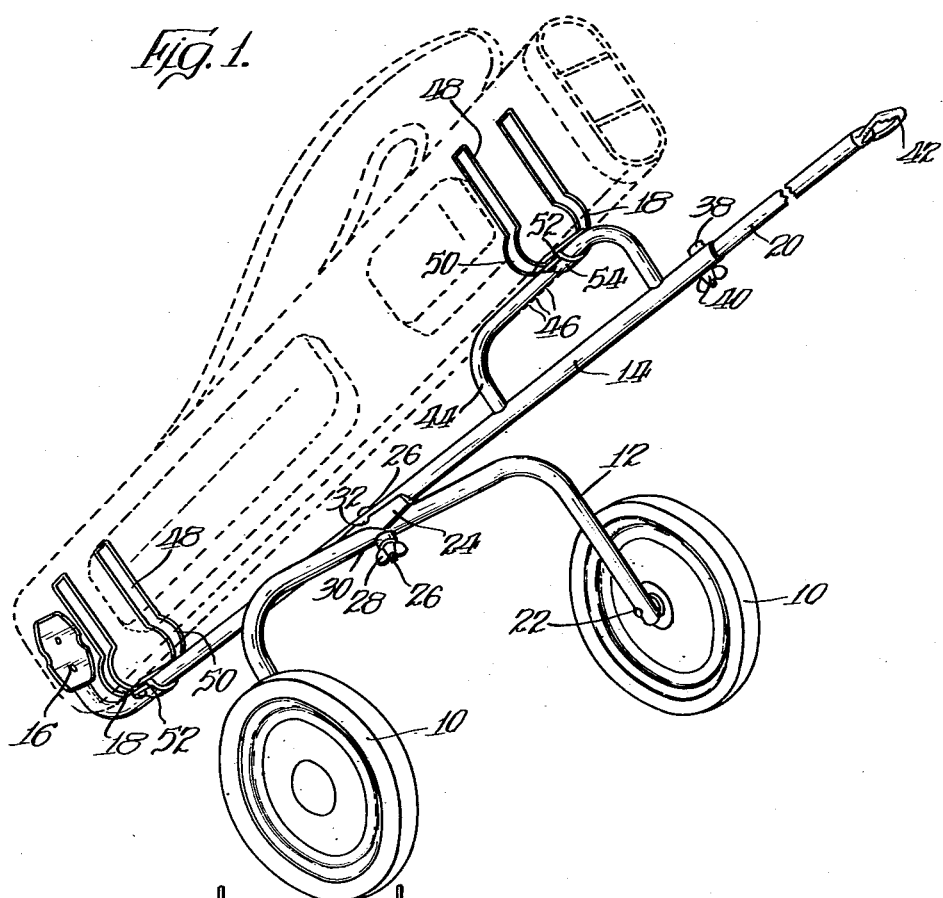
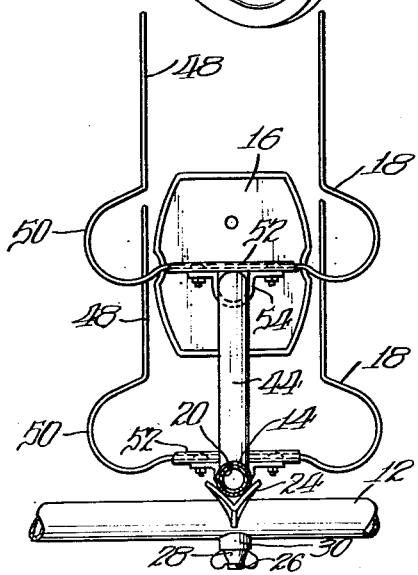
INVENTOR.
Carl M. Rutledge
BY
Brown, Jackson, Boettcher & Dienner
Attys.

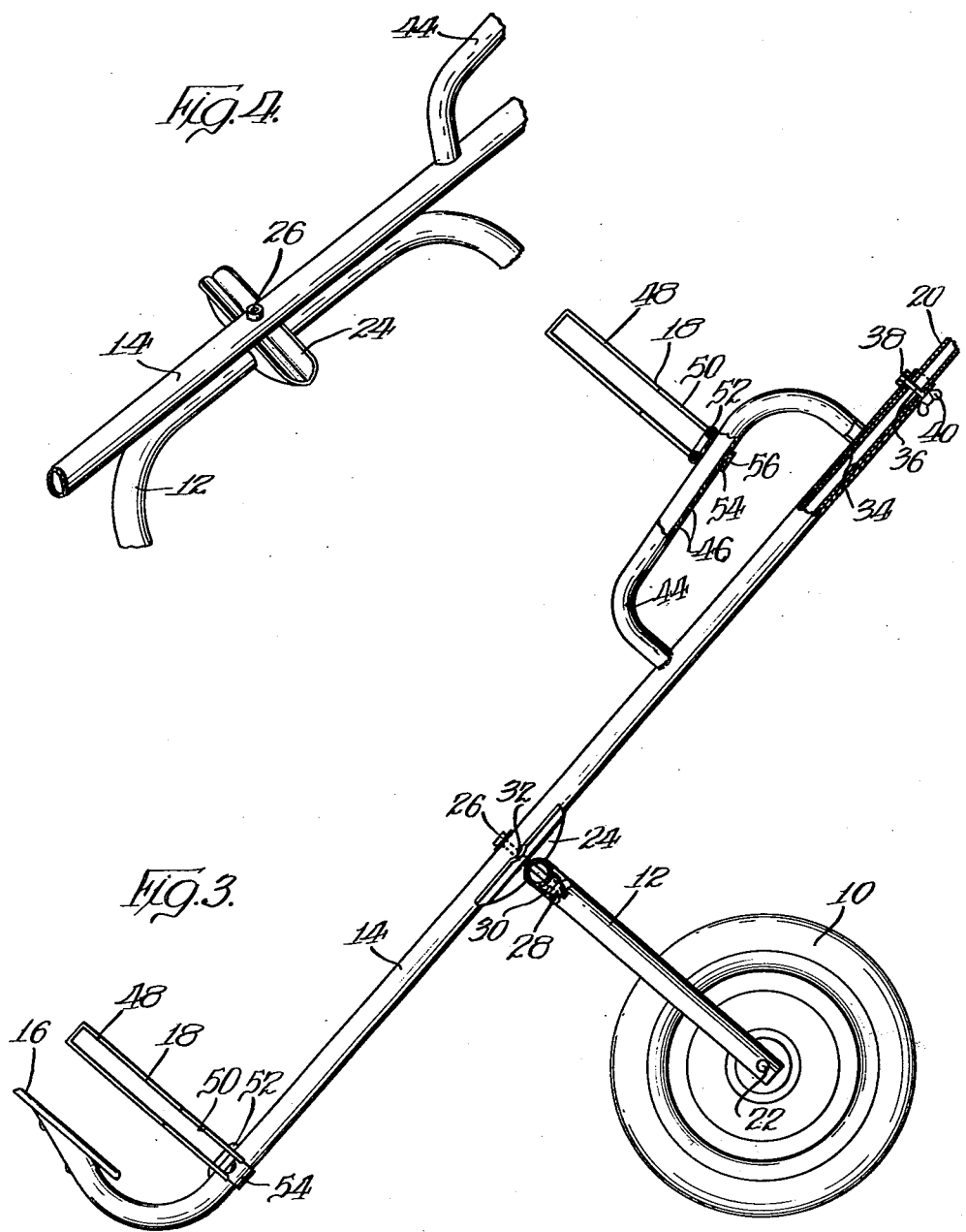

UNITED STATES PATENT OFFICE 2,687,895

GOLF CART

Carl M. Rutledge, Chicago, Ill.

Application October 1, 1952, Serial No. 312,451

3 Claims. (Cl. 280—47.26)

The present invention relates to carts or vehicles for the transportation of a golf club bag or the like.

Many proposals for carts of the character referred to have been previously made. Of these, many are of the collapsible type, for example, the collapsible wheeled cart of my co-pending application, Serial No. 207,001, filed January 20, 1951. Others are of a fixed or non-collapsible nature. The present invention relates to a cart that is not actually collapsible, but is adapted to be readily "knocked-down" or disassembled so as to occupy less room for storage and shipping purposes than the same would occupy in its normal wheelable disposition.

It is an object of the present invention to provide an improved cart for golf clubs and the like that is extremely economical of manufacture and assembly and that possesses exceptionally good balance and wheeling characteristics.

Another object of the present invention is to provide an improved cart that is adapted to be quickly and readily assembled, partially disassembled, or completely disassembled and that, when disassembled, occupies less space for storage and shipping purposes than previously proposed carts of the general character.

A further object of the invention is the provision of an improved cart of exceptionally good balance that is adapted to retain a golf bag, or the like in an upright position thereon, whereby all compartments of the bag will be located or exposed for ready and convenient use.

A still further object of the invention is the provision of an improved cart including means accommodating adjustment of at least one golf bag support, whereby the cart is adapted for the reception of bags of various sizes and lengths.

Other objects and advantages of the present invention will become apparent in the following detailed description of a preferred embodiment of the invention, wherein reference is made to the accompanying drawings, in which:

Figure 1 is a perspective view of the improved cart of the present invention, the view showing, in dotted lines, a golf bag mounted on the cart;

Figure 2 is a view along the main shaft of the cart taken from below the upper end of the main shaft;

Figure 3 is a side view, partly in section and partly in elevation, of the cart of the present invention; and Figure 4 is a partial perspective view of the cart as partially disassembled or collapsed.

Referring now to the drawings, the cart of the present invention comprises, basically, a pair of spaced parallel ground engaging wheels 10, an inverted U-shaped frame 12 at the opposite ends of which the wheels are mounted for rotation, a main support or shaft 14 detachably connected to the bight portion of the frame 12 and normally extending parallel to the planes of the wheels intermediate thereof, a bottom bag support 16 connected to the lower end of the main shaft 14, a pair of bag supporting or gripping members or means 18 disposed at spaced points on the shaft 14, and a handle 20.

The U-shaped wheel frame 12 is preferably formed of tubular stock, as are the main shaft 14 and the handle 20, and is provided adjacent the free end thereof with laterally extending axles 22 upon which the wheels 10 are rotatably journaled, the wheels being held on the axles in any suitable or customary manner. The axles 22 may suitably comprise studs or shafts passed through diametrical bores provided adjacent the ends of the U-shaped frame 12 and welded thereto. At the mid-point of the bight portion of the U-shaped frame 12, a guide bracket 24 is fixedly secured, suitably by welding, to the frame 12 transversely of the axis of the tube. In end view, as shown in Figure 2, the bracket 24 presents an upwardly open V-shaped channel adapted for the reception and guidance of the main shaft 14. The bracket 24 and frame 12 are provided with aligned bores extending perpendicularly to the longitudinal axis of the bracket, which bores are adapted for the reception of a stud or bolt 26 secured to the main shaft 14 and extending radially outward and downward therefrom. As shown in the drawings, the member 26 comprises a bolt passed through a diametrical bore in the tubular shaft 14 and welded to the shaft 14. It will be appreciated, however, that the member 26 could suitably comprise merely a stud welded to the lower side of the shaft 14. In assembling the frame 12 and shaft 14, the stud or bolt 26 is passed through the bores in the guide member 24 and the frame 12 and is detachably secured to the frame 12 by means of a wing nut 28 threaded to the projecting lower end thereof. If desired, a guide washer 30, having a cut-out upper surface conforming to the configuration of the tube 12, may be provided to maintain accurate connection and alignment of the members 12 and 14.

In addition to defining the V-shaped channel for the reception and guidance of the shaft 14, the bracket 24 is provided in the opposite walls thereof, at the central portion thereof, with semicircular cutouts 32 aligned with the tube 12 and defining a second guide channel. The purpose of the guide channel defined by the cutouts 32 is to lock the main shaft 14 and the U-shaped frame 12 together in partially collapsed or "knocked-down" disposition wherein the members 12 and 14 are disposed parallel to one another, instead of at right angles, as is shown in Figure 4. To attain this position, the wing nut 28 is loosened to accommodate relative movement between the members 12 and 14. Then, the members 12 and 14 are swung with respect to one another into parallel relation, with the shaft 14 being received in the cutouts 32. Thereafter, the nut 28 is retightened to retain the frame 12 and shaft 14 in the partially collapsed or "knocked-down" disposition.

At the lower end thereof, the main shaft tube 14 is curved laterally outwardly in a direction opposite the stud 26. At the outer end thereof, the tube is beveled off to provide a supporting surface for the bottom bag support 16. The bottom bag support 16 preferably comprises a metallic plate of relatively thin section secured to the beveled end of the main shaft 14, suitably by rivets.

The main shaft 14 is formed of tubular stock having a slightly larger inner diameter than the outer diameter of the tubular stock from which the handle 20 is formed, so that the handle 20 is received within and is capable of telescopic movement within the shaft 14. To secure the handle 20 to the shaft 14 in an adjusted position, the handle 20 is provided, as shown in Figure 3, with a plurality of longitudinally spaced diametrical bores 34. The shaft 14 is provided adjacent its upper end with a diametrical bore through which, and through one of the bores 34 in the handle 20, is adapted to extend a stud or bolt 36. In the structure shown, a nut 38 is secured, suitably by welding, to the upper surface of the shaft 14 in alignment with the diametrical bore therethrough and the bolt 36 is provided with a wing head 40 to facilitate manual passage of the bolt 36 through the shaft 14 and handle 20 and threading of the same into the nut 38 to secure the handle in an adjusted position longitudinally of the shaft 14. As an alternative, it will be appreciated that other adjustable locking or securing means, well known to the art, could be employed. At the outer end thereof, the handle 20 is provided with a hand grip 42 comprising a generally elliptical ring adapted for the passage of the user's fingers.

In use, the cart normally will be grasped at the hand grip 42 and pulled behind the user so that the cart would travel to the right as the same is viewed in Figures 1 and 3. Accordingly, the side of the shaft 14 to which the frame 12 is connected may be conveniently referred to as the lower or forward side and the other side may be referred to as the upper or rearward side. In other words, the stud 26 extends from the forward or lower side of the shaft 14 and the support 16 extends from the rearward side thereof. As shown in the drawings, it is preferable to dispose the wing nut 28 and the wing head 40 of the bolt 36 to the forward or lower side of the shaft 14 for ready access even when a golf bag is mounted on the cart.

Adjacent the upper end of the shaft 14, and projecting from the rearward or upper side thereof, a generally U-shaped frame or bracket member 44, preferably formed of tubular stock, is secured thereto, with the bight portion of the U aligned with the shaft 14. The bight of the U-shaped bracket 44 is not, however, disposed parallel to the shaft 14, but is inclined inwardly and downwardly with respect thereto in a plane generally aligned with or passing through the lower end of the straight portion of the shaft 14. The purpose of the bracket 44 is to provide a golf bag support of such nature that the bag is disposed on the cart for exceptionally good cart balance and wheeling characteristics and for disposition of the bag in such manner that the upper end thereof is spaced from the shaft 14 and handle 20 for ready removal of the golf clubs. The particular reason for providing a U-shaped frame rather than a post or the like, however, is to provide means for accommodating adjustment to various lengths of bags. To this end, the tubular bracket 44 is provided in the bottom wall thereof with a plurality of spaced bores 46. Mounted upon the bracket 44 is the upper bag support or gripping means 18 which comprises a flexible generally U-shaped frame 48, preferably formed of a double looped wire, characterized by bowed portions 50 between the bight and leg portions thereof, and a bracket 52 including a flanged U-shaped clamp 54 encircling the bight portion of the bracket 44 and having attachment to the frame 48 through a bracket plate or the like. At the central portion thereof, the clamp 54 is provided with a dimple 56 adapted to be fitted within one of the bores 46 in the bracket 44, whereby the support or gripping means 18 may be adjusted longitudinally of the bight portion of the bracket 44 to accommodate bags of various lengths. The dimple or projection 56 fitting in one of the bores 46 prevents accidental displacement of the gripping means, either axially or rotationally.

The lower bag supporting or gripping means 18 is identical to the upper bag supporting or gripping means 18 and may be adjustably mounted on the shaft 14 in the same manner as the upper means 18 is mounted on the bracket 44. However, there is no necessity for adjusting the lower supporting or gripping means 18, so it is preferable to have that means fixed in one position on the shaft 14. The predominant feature of the gripping means 18, in addition to the fact that the same accommodate bags of various widths due to the resiliency and bowed portions 50 thereof, is that the same retain the bag on the cart in an upright position, as shown in dotted lines in Figure 1, so that all compartments of the bag are exposed for ready access. By upright position is meant not only vertically upright, but horizontally upright. This is of particular importance for retaining golf bags provided with a plurality of individual compartments each adapted for the reception of one club, that is, a plurality of outer compartments for irons and four central compartments for woods.

From the foregoing, it will be appreciated that the cart of the present invention consists of only nine parts or sub-assemblies, namely, the two wheels 10, the U-frame 12, the main shaft 14 (including the bottom support 16, the stud 26, the nut 38 and the bracket 44), the handle 20, the two supports 18, the wing nut 28 and the wing head bolt 36. If a circumferential clamp were substituted for the bolt 36 and nut 38, the same would be secured directly to the shaft 14 and would reduce the number of sub-assemblies of the cart to eight. Due to this arrangement, the cart, when completely disassembled or "knocked-down," occupies very little space and can be conveniently packaged in a relatively small container for storage and shipping. The assembly of the parts is very easily accomplished as is apparent from the foregoing. When assembled, the cart of the present invention is extremely easy to use, has exceptionally good balance, accommodates bags of various lengths and sizes, and retains the bags in an upright position. For temporary storage or transport, the cart can be readily and conveniently partially disassembled, collapsed or "knocked-down," merely by loosening the nut 28, swinging the frame 12 to the position shown in Figure 4 and removing the bolt 36 to remove the handle 20, or to slide the handle 20 completely into the shaft 14. Since the various members of the cart are formed of tubular stock, preferably aluminum, it will be appreciated that the cart of the present invention is very sturdy and yet is very light in weight.

With respect to cart balance and wheeling characteristics, it is to be noted from Figure 1 that the main shaft 14 is nearly centrally balanced with respect to the frame 12 and wheels 10 and that a golf bag mounted on the cart will be centrally balanced over the wheels. This arrangement provides "center-poise" support for the bag and the cart so that the user of the cart is not required to support or carry a portion of the load but merely guides and pulls the cart. The wheels are wide spread, thus substantially negativing the possibility of overturning. When the cart is rested on the ground, the supporting triangle of the wheels 10 and the lower end of the shaft 14 is large enough to provide a stable support.

From the foregoing, it will be appreciated that the present invention provides an improved golf cart enjoying advantages heretofore unattained in the art. The same is light in weight, has exceptionally good balance, and is adapted to transport a golf bag or the like in a most convenient manner.

While I have described what I regard to be a preferred embodiment of my invention, it will be appreciated that various changes, rearrangements and modifications may be made therein without departing from the scope of the invention, as defined by the appended claims.

I claim:

1. A wheeled cart for transporting a golf bag or the like comprising a pair of spaced parallel ground engaging wheels, a fixed inverted tubular U-shaped frame, a pair of axles secured to said frame adjacent the free ends thereof, said axles extending transversely of the legs of said U-shaped frame and supporting said wheels for rotation, a tubular main shaft connected intermediate its ends to the bight portion of said frame and normally extending parallel to the planes of said wheels and intermediate thereof, a tubular handle telescopically associated with the upper end of said shaft, means for detachably securing said handle to said shaft in an adjusted position, and a plurality of bag supports connected to said shaft and extending from one side thereof, said supports being adapted to retain a bag in upright position on said shaft, one of said supports being positioned adjacent the upper end of said shaft and being adjustable longitudinally of said shaft.

2. In a wheeled cart for transporting a golf bag or the like having a pair of spaced parallel ground engaging wheels, an inverted U-shaped frame supporting said wheels for rotation adjacent the free ends thereof, a guide member secured to said frame centrally of the bight portion thereof, said guide member including a pair of guide channels disposed at right angles to one another, one of said guide channels being aligned with said frame and the other extending transversely thereof, a main shaft detachably connected to the bight portion of said frame for guidance by either of said guide channels of said guide member, said shaft normally being guided by the said other of said guide channels and extending parallel to the planes of said wheels intermediate thereof, and a handle detachably secured to said shaft; a bottom bag support secured to said shaft adjacent one end thereof, a generally U-shaped bracket secured to said shaft in alignment therewith adjacent the other end thereof, and a bag support adjustably mounted on the bight portion of said U-shaped bracket, said supports and bracket extending laterally from one side of said shaft, said supports being adapted to retain a bag in an upright position on said shaft.

3. A wheeled cart for transporting a golf bag or the like, comprising a pair of spaced parallel ground engaging wheels, a fixed inverted tubular U-shaped frame, a pair of axles secured to said frame adjacent the free ends thereof, said axles extending transversely of the legs of said U-shaped frame and supporting said wheels for rotation, a guide member secured to said frame centrally of the bight portion thereof, said guide member including a pair of guide channels disposed at right angles to one another, one of said guide channels being aligned with said frame and the other extending transversely thereof, a main shaft adapted to be selectively received within and guided by the guide channels of said guide member, a stud secured to said shaft and extending radially outwardly thereof, said stud extending through said guide member and the bight portion of said frame, a nut threaded to said stud for detachably and adjustably connecting said shaft to said frame for selective guidance by said guide member, said shaft normally being guided by said other of said guide channels and extending parallel to the planes of said wheel intermediate thereof, said shaft being turned laterally outwardly in a direction opposite to said stud at one end thereof, a bottom bag support secured to said shaft at the said one end thereof, a first flexible bag support connected to said shaft adjacent the said one end thereof and extending laterally of said shaft in the direction of said bottom bag support, a generally U-shaped bracket secured to said shaft in alignment therewith adjacent to the other end thereof, the bight portion of said U-shaped bracket being inclined inwardly with respect to said shaft in the direction of said bottom bag support, a second flexible bag support adjustably mounted on the bight portion of said U-shaped bracket, said second flexible bag support being adjustable longitudinally of said shaft on said U-shaped bracket to accommodate the cart to bags of different lengths, said U-shaped bracket and said second flexible bag support extending laterally from said shaft in the same direction as said bottom bag support, said flexible bag supports being so constructed and arranged as to retain a bag in an upright position on said shaft, a tubular handle telescopically associated with the upper end of said shaft, and means for detachably securing said handle to said shaft in adjusted position longitudinally thereof, said handle terminating in a hand grip.

References Cited in the file of this patent

UNITED STATES PATENTS

| Number | Name | Date |
| --- | --- | --- |
| 2,471,751 | Hutsell | May 31, 1949 |

FOREIGN PATENTS

| Number | Country | Date |
| --- | --- | --- |
| 667,237 | Great Britain | Nov. 28, 1950 |